Oct. 26, 1965        R. D. MAURER         3,214,702
       TRAVELING WAVE LASER AMPLIFIER WITH GLASS FILTER
                    Filed Feb. 10, 1964
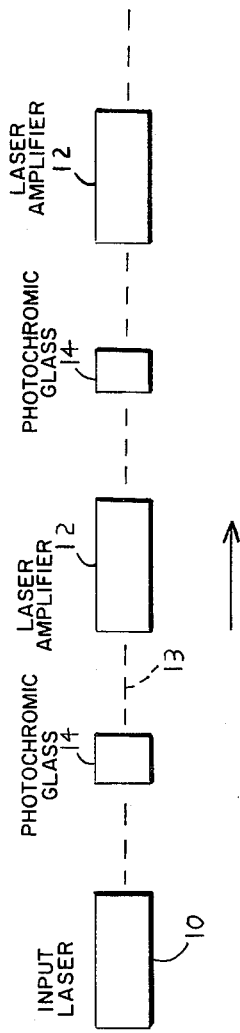
INVENTOR.
ROBERT D. MAURER
BY *William D. Fosdick*
AGENT

United States Patent Office 3,214,702
Patented Oct. 26, 1965

3,214,702
TRAVELING WAVE LASER AMPLIFIER
WITH GLASS FILTER
Robert D. Maurer, Painted Post, N.Y., assignor to Corning Glass Works, Corning, N.Y., a corporation of New York
Filed Feb. 10, 1964, Ser. No. 343,751
3 Claims. (Cl. 330—4.3)

This invention relates to traveling wave laser amplifiers and more particularly to such amplifiers employing novel means for effectively optically isolating the respective components of the amplifier from one another.

It is characteristic of a laser that it employs a medium in which there is established at least intermittently a non-equilibrium population distribution in a pair of spaced energy levels of its energy level systems, the population of the higher of the selected pair of energy levels being larger than that of the lower. It is now usual to describe a medium which is in such a state of nonequilibrium as exhibiting a negative temperature. A traveling wave laser amplifier comprises a plurality of laser amplifying components which exhibit negative temperatures and which are arranged along a radiation transmission path. At one end of the transmission path is located an input light source, such as a self-contained laser oscillator, i.e., a laser which includes means for causing the laser to emit stimulated radiation along the transmission path of the amplifier. Since each of the amplifying components of the traveling wave amplifier is pumped to a highly excited amplifying state in which it exhibits a negative temperature, each such component is highly unstable. Spontaneous fluorescence from any one of the amplifying components, if permitted to reach the remaining such components, will set off a chain reaction in which the light produced by the fluorescence will be progressively amplified, draining off the stored energy in the other amplifying components and causing a high intensity light pulse at an undesired time. Thus, in order to prevent such premature emission of radiation from the amplifier, it is desirable to provide means for preventing the triggering of the amplifying components by such stray radiation, while permitting desired radiation to be amplified therein.

It is an object of the present invention to provide a novel and particularly effective means for bringing about such optical isolation of the components of a traveling wave laser amplifier.

It has been found that such optical isolation may be effected by interposing between laser components of such amplifiers bodies comprising certain glasses which exhibit the ability to darken under radiation of short wavelengths and to increase in transparency when exposed to longer radiations. The use of such glasses, referred to as photochromic glasses, as optical isolators according to the present invention is illustrated in the accompanying drawing, which is a schematic diagram of a traveling wave amplifier employing such a glass.

Referring to the drawing, in one embodiment, an amplifier according to the present invention comprises as its input light source ruby laser 10, which includes conventional means, such as a helical flash lamp, for exciting the ruby active element thereof and for effecting stimulated emission therefrom. Arranged in sequence along transmission path 13 of the amplifier are a plurality of amplifying components 12 comprising standard ruby rods which exhibit negative temperatures as a result of the absorption of radiation thereby. Radiation emitted from laser 10 triggers the nearest amplifying component 12, releasing the stored energy of the component in the form of a beam of radiation coherent with the triggering radiation and in the direction of the next amplifying component, where a similar reaction takes place. Similarly, the radiation emitted by each amplifying component is in turn coherently amplified by the next amplifying component along the transmission path. Thus, radiation traveling in the direction of the arrow in the drawing is progressively amplified until it emerges from the last amplifying component of the apparatus.

In order to prevent the triggering of any amplifying component 12 by spontaneous fluorescence from any one of the remaining amplifying components, photochromic glass bodies 14 are located between the respective components. These photochromic glass bodies have previously been darkened by the action of radiation differing from that emitted by the components of the present amplifier. Inasmuch as this previously darkened glass will absorb spontaneous fluorescence of the intensities emitted by the components of the amplifier, such fluorescence will be prevented from reaching any other such component and triggering it. Due to the ability of the photochromic glass to be bleached by stimulated radiation of the wavelengths and intensities emitted by input laser 10 and amplifying components 12 during normal operation thereof, the first part of a stimulated light pulse emitted by any such component is absorbed by the photochromic glass body, but such absorption effects bleaching of the glass, thereby permitting the latter part of the light pulse to pass therethrough and to trigger the next amplifying component. Thus, although low intensity spontaneous fluorescence will not cause bleaching of the photochromic glass and, accordingly, will not pass through the glass in significant amounts, high-intensity stimulated emission is only slightly decreased thereby.

Due to the fact that photochromic glass bodies 14 may be redarkened by the influence of radiation of wavelength other than that of the stimulated emission of the components of the present amplifier, after discharge of the amplifier such radiation may be utilized to redarken the glass, thereby restoring the amplifier to operative condition.

Photochromic glass bodies 14 preferably comprise silicate glass bodies having in at least a portion thereof inorganic crystals which become darker in color upon exposure to actinic radiation of wavelengths between 0.3 and 0.5 micron, the concentration of the crystals in the portion being at least 0.005 percent by volume. Due to the fact that such photochromic glass can be darkened by radiation of such wavelengths, which are within the range between blue and ultraviolet, after elements 14 have been bleached by the longer wavelength radiations produced by the laser components of the amplifier, the glass can be redarkened without disassembly of the amplifier by merely directing thereupon radiation within the above-mentioned range of wavelengths. Due to the fact that photochromic glass can be alternately darkened and bleached indefinitely, such glass need not be replaced and forms a permanent part of the amplifier.

The crystals contained in the glasses comprising optical isolators 14 of the amplifier may comprise silver chloride, silver bromide or silver iodide. The characteristics and production of such glasses are described in the copending application of William H. Armistead and Stanley D. Stookey, Serial No. 213,634, filed July 31, 1962. Similarly effective compositions are disclosed in the copending application of Roger J. Araujo, Serial No. 278,323, filed May 6, 1963.

Although all compositions disclosed in these copending applications may be employed as optical isolators in amplifiers according to the present invention, a particularly satisfactory composition for the photochromic glass component of such glass amplifiers comprises 58.27% $SiO_2$, 9.7% $Al_2O_3$, 19.4% $B_2O_3$, 10.9% $Na_2O$, 0.03% $K_2O$, 0.29% Cl, 0.79% F, 0.6% Ag, 0.016% CuO and 0.008% $Fe_2O_3$.

The present invention is not limited to utilization in amplifiers employing ruby lasers as their active elements, but can be utilized in all amplifiers employing any number of components emitting light at wavelengths within the range leading to bleaching of the photochromic glasses. In general, presently known photochromic glasses are bleached by radiation within the range 4,000 A. to 12,000 A.

Further variations may be made within the scope of the present invention, and, accordingly, it is intended that the scope of the invention be limited only by the scope of the appended claims.

I claim:

1. In a traveling wave laser amplifier comprising at least one laser amplifying component located along a laser radiation transmission path and exhibiting a negative temperature and an input laser component located at one end of said path, the improvement which comprises a body comprising photochromic glass located along said path and between two said components, said photochromic glass having its ability to transmit coherent radiation of a given wavelength emitted by said components increasable by said coherent radiation emitted by said components and decreasable by radiation of wavelength differing substantially from said given wavelength.

2. The improvement according to claim 1 in which said photochromic glass comprises a silicate glass body having in at least a portion thereof inorganic crystals which become darker in color upon exposure to actinic radiations of wavelengths between 0.3 and 0.5 micron, the concentration of said crystals in said portion being at least 0.005 percent by volume.

3. The improvement according to claim 1 in which said photochromic glass comprises a silicate glass body having in at least a portion thereof crystals of at least one silver halide selected from the group consisting of silver chloride, silver bromide and silver iodide, the concentration of said crystals in said portion being at least 0.005 percent by volume.

References Cited by the Examiner

Geusic et al.: "Bell System Technical Journal," July 1962, pages 1371–1397.

ROY LAKE, *Primary Examiner.*

BENNETT G. MILLER, *Examiner.*